United States Patent [19]

Ishida et al.

[11] Patent Number: 4,762,987

[45] Date of Patent: Aug. 9, 1988

[54] AUTOMATIC FOCUSING SYSTEM WITH CORRELATION-DETERMINED DISABLING

[75] Inventors: Tokuji Ishida, Daito; Masataka Hamada, Osaka, both of Japan

[73] Assignee: Minolta Camera Kabushiki Kaisha, Osaka, Japan

[21] Appl. No.: 87,689

[22] Filed: Aug. 20, 1987

Related U.S. Application Data

[63] Continuation of Ser. No. 889,117, Jul. 22, 1986, abandoned.

[30] Foreign Application Priority Data

Jul. 26, 1985 [JP] Japan ................ 60-166540

[51] Int. Cl.$^4$ .............................................. G01J 1/20
[52] U.S. Cl. .................................. 250/201; 250/204; 354/408
[58] Field of Search ............. 250/201 PF, 204; 354/406, 407, 408; 356/4, 1

[56] References Cited

U.S. PATENT DOCUMENTS

| | | |
|---|---|---|
| 4,184,968 | 1/1980 | Stauffer . |
| 4,297,571 | 10/1981 | Utagawa et al. . |
| 4,305,657 | 12/1981 | Masunaga et al. . |
| 4,387,975 | 6/1983 | Araki ........................... 354/407 |
| 4,470,676 | 9/1984 | Kinoshita et al. . |
| 4,492,448 | 1/1985 | Ishikawa et al. . |
| 4,523,829 | 6/1985 | Eguchi et al. . |
| 4,529,287 | 7/1985 | Karasaki et al. . |
| 4,540,881 | 9/1985 | Hyashi et al. ............... 250/201 PF |
| 4,561,749 | 12/1985 | Utagawa . |
| 4,573,784 | 3/1986 | Suzuki . |
| 4,636,624 | 1/1987 | Ishida et al. ....................... 250/204 |
| 4,647,174 | 3/1987 | Tsunekawa et al. . |
| 4,668,084 | 5/1987 | Suzuki et al. . |

Primary Examiner—Edward P. Westin
Assistant Examiner—Khaled Shami
Attorney, Agent, or Firm—Price, Gess & Ubell

[57] ABSTRACT

A deviation detecting device comprising an optical system for forming correlated first and second images of an object; first and second image sensors for sensing the first and second images so as to generate first and second outputs representative of the intensity distributions thereof, respectively; a correlation detector for shifting the first output relative to the second output while incrementally changing the amount of shifting so as to detect a plurality of correlation degrees representative of the degrees of the correlation between the first and second outputs at different shift position defined by the incremental change in the amount of shifting; a highest correlation shift position detector for detecting the shift position which is defined by the amount of shifting providing the highest correlation degree; a calculation unit for calculating, based on the shift position detected by highest correlation shift position detector, data corresponding to the amount of deviation of the first and second images from a reference value; and a first determination unit for determining which of the correlation degree at a shift position next to the highest correlation shift position and the correlation degree at a position further next to the highest correlation shift position is lower than the other. The calculation unit is arranged to be disabled when the determination by the first determination unit indicates that the correlation degree at the shift position next to the highest correlation one is lower than that at the shift position further next thereto.

16 Claims, 5 Drawing Sheets

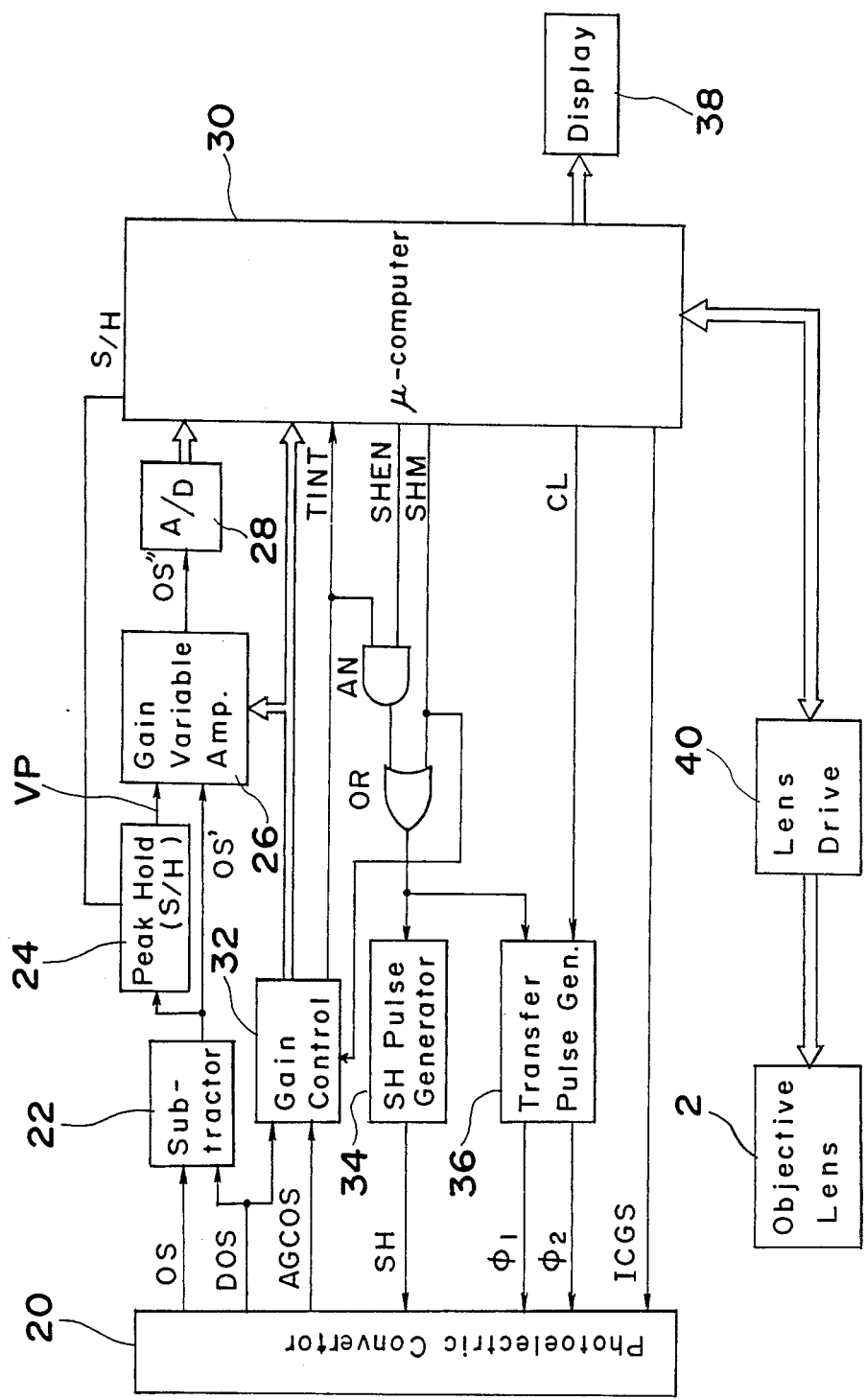

AUTOMATIC FOCUSING SYSTEM WITH CORRELATION-DETERMINED DISABLING

This is a continuation application of Ser. No. 889,117, filed on July 22, 1986 now abandoned.

BACKGROUND OF THE INVENTION

The present invention relates to a deviation detecting device which detects the amount of deviation of first and second images of a target object from their reference positions through detection of light intensity distributions of the first and second images for determination of the focus condition of an objective lens relative to the target object or for determination of the distance to the target object. The first and second images of the target object, which are correlated with each other, are formed in such a manner that their relative positions vary according to the focus condition of the objective lens relative to the target object or the distance to the target object.

In the deviation detecting device of the type described above, the first and second images are respectively detected by first and second light distribution detecting means which produce time-seriated outputs representative of the light intensity distributions of the first and second images respectively. The output of the second light distribution detecting means is sequentially shifted by a predetermined quantity relative to the output of the first light distribution detecting means and the degree of the correlation between these outputs at each shift position is then calculated. Of the correlation degrees so calculated, the highest correlation degree is determined and thereafter the highest correlation shift position providing the highest correlation degree is determined. The amount of deviation of the first and second images from their reference positions are then determined based on the amount of shift from a reference shift position to the highest correlation shift position. The reliability of the deviation detection performed in the manner so far described depends on whether or not the highest correlation degree so calculated has a reliable value, and a method for determining the reliability is suggested in U.S. Pat. Nos. 4,305,657 and 4,561,749.

According to U.S. Pat. No. 4,305,657, it is determined that the deviation direction is reliable if the highest correlation degree at the highest correlation shift position is greater than a predetermined value and that the deviation detection is not reliable if the maximum correlation degree at the highest correlation shift position is smaller than the predetermined value. On the other hand, according to U.S. Pat. No. 4,561,749, comparison of the highest correlation degree at the highest correlation shift position with a predetermined value is not effected for determination of the reliability of the deviation detection. However, interpolation based on a geometric technique using the highest correlation degree at the highest correlation shift position and the correlation degrees at the next highest correlation shift positions on the both sides of the highest correlation shift position is carried out to find a value presumed to be a true highest correlation degree which more exactly indicates the coincidence between the first and second images than the highest correlation degree at the highest correlation shift position, and thereafter it is determined whether the deviation detection is reliable or not reliable, depending on whether the value found by the interpolation being greater or smaller than predetermined value.

According to these methods, it has been known that the determination of the reliability provides a good result under normal conditions wherein the correlation degrees between the outputs of the first and second light distribution detecting means decrease monotonously in opposite directions with respect to the highest correlation shift position. However, where the target object has a brightness distribution of high frequencies, or where the target object has such a low brightness that respective outputs of the first and second light distribution detecting means may predominantly contain high frequency components because of the superposition of noises, the correlation degrees tend to fluctuate and, therefore, it may happen that, even if the correlation degree which becomes highest is determined out of them, it would not represent the true highest correlation degree of the first and second images of the target object. Accordingly, in such a case, any one of the above described known methods is likely to result in an error in the result of reliability determination and, erroneous focus detection or erroneous distance measurement may take place based on the result of the deviation detection which ought to have been not reliable.

SUMMARY OF THE INVENTION

Accordingly, the present invention has for its essential object to provide a deviation detecting device of the above described type which is effective to avoid any possible erroneous focus detection or distance measurement which would result from erroneous determination of the highest correlation degree.

Another object of the present invention is to provide an automatic focusing system or an image sensing system utilizing the deviation detecting device having the above feature.

The deviation detecting device according to the present invention is featured in means for determining which of the correlation degree at the shift position next to the highest shift position and that at the shift position further next to the highest shift position is lower than the other. When this means determines that the correlation degree at the shift position next to the highest shift position is lower than that at the shift position further next to the highest shift position, calculation means for calculating the amount of deviation based on the highest correlation shift position is disabled. The fact that the correlation degree at the shift position next to the highest correlation shift position is lower than that at the shift position further next to the highest correlation shift position indicates that the correlation degrees do not monotonously decrease from the highest correlation shift position. As this happens when the highest correlation degree is not reliable because of fluctuation of the correlation degrees in the vicinity of the highest correlation shift position, erroneous focus detection or erroneous distance measurement would take place, if the amount of deviation were calculated on the basis of the highest correlation shift position providing the highest correlation degree. According to the present invention, erroneous focus detection or distance measurement can be avoided because no deviation detection is carried out in such a case due to the disablement of the calculation means.

BRIEF DESCRIPTION OF THE DRAWINGS

The above and other objects and features of the present invention will become clear from the following description taken in conjunction with preferred embodiments thereof with reference to the accompanying drawings, in which:

FIG. 4 is a circuit block diagram of the embodiments of the present invention;

DETAILED DESCRIPTION OF THE EMBODIMENTS

Figure 1:
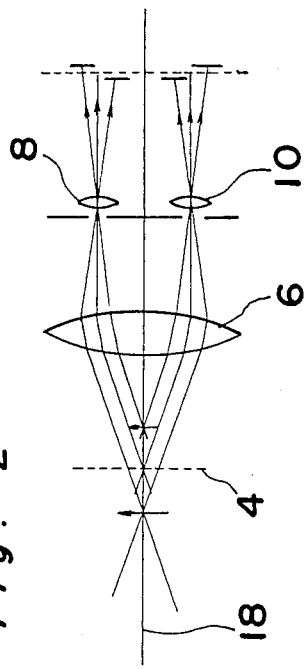
FIGS. 1 and 2 are diagrams showing an optical system used in embodiments of the present invention.

Before the description of the present invention proceeds, it is to be noted that like parts are designated by like reference numerals throughout the accompanying drawings.

Figure 2:
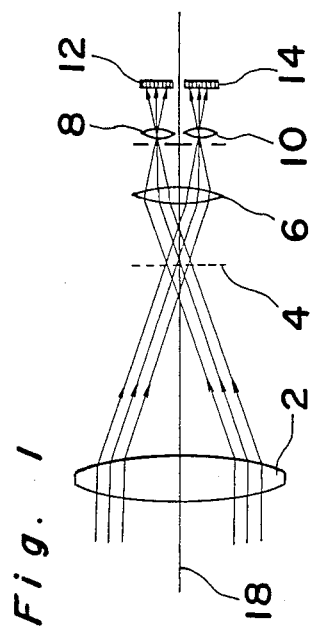

Referring first to FIGS. 1 and 2, there is shown an optical system according to one embodiment of the present invention designed to detect the distance or interval between two images for the purpose of detecting the focus of an objective lens of a photographic camera with respect to a target object to be photographed.

The illustrated optical system includes a condenser lens 6 positioned in alignment with, or rearwardly of, a predetermined focal plane 4 positioned rearwardly of the objective lens 2, a pair of image re-forming lenses 8 and 10 positioned rearwardly of the condenser lens 6, and a pair of line sensors 12 and 14 positioned respectively at corresponding image forming planes of the image re-forming lenses 8 and 10, each of the line sensors 12 and 14 having a charge coupled device (CCD) used as a photo-sensor array. As shown in FIG. 2, two images falling respectively on the line sensors 12 and 14 are located close towards the optical axis 18 in the case of a front focus condition, that is, the condition of the objective lens wherein an image of the target object is formed forwardly of the predetermined focal plane, but distant from the optical axis 18 in the case of a rear focus condition, that is, the condition wherein the image of the target object is formed rearwardly of the predetermined focal plane. In the case of an in-focus condition wherein the image of the target object is formed on the predetermined focal plane, the interval between corresponding points of the two images represents a specific distance determined by the design of the optical system. Thus, in principle, the detection of the interval between the two images can give an indication of the focus condition of the optical system.

Figure 3:
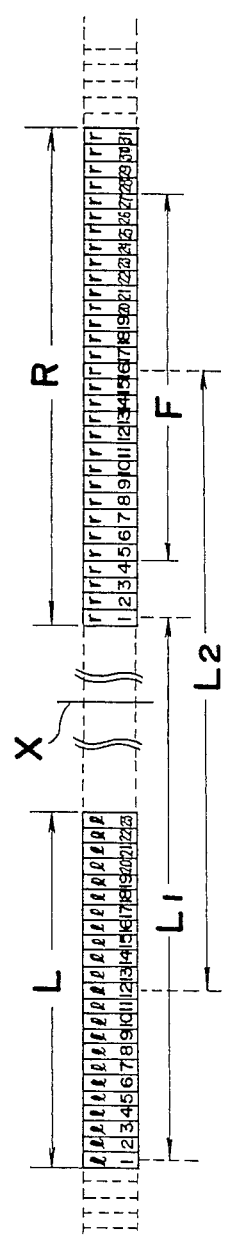
FIG. 3 is a plan view of a line sensor used in the embodiments of the present invention.

FIG. 3 illustrates a front elevational view of a line sensor used as the line sensors 12 and 14 shown in FIG. 1. In this embodiment, a single line sensor formed on a single semiconductor chip is divided into two regions which are used as the line sensors 12 and 14, respectively, although separate line sensors may be employed as the line sensors 12 and 14. In FIG. 3, reference character X represents a position through which the optical axis of the objective lens extends. Respective outputs from pixels in the vicinity of the axis passing position X through which the optical axis extends are not utilized.

Reference characters $l_1$ to $l_{23}$ represent pixels belonging to a standard region L corresponding to one of the line sensors, which region L contains 23 pixels. A light sensing element for monitoring the luminance on the pixels is provided above the standard region L although not shown.

Reference characters $r_1$ to $r_{31}$ represent pixels belonging to a reference region R corresponding to the other of the line sensors, which region R contains 31 pixels, the number being greater than the number of the pixels belonging to the standard region L. The pixel $l_1$ of the standard region L which is located farthest from the axis passing position X and the pixel $r_1$ of the reference region R which is closest to the axis passing position X are assumed to be spaced a distance $L_1$. Also, let it be assumed that, when and so long as the objective lens is in an in-focus condition, the image falling on the pixels $l_1$ to $l_{23}$ of the standard region L coincides with the image falling on the pixels $r_5$ to $r_{27}$ of the reference region R. The pixels $r_5$ to $r_{27}$ of the reference region R are designated as an in-focus block F. The pixel $l_{12}$ which is located at the center of the standard region L is spaced a distance $L_2$ from the pixel $r_{16}$ which is located at the center of the in-focus block F of the reference region R. It is to be noted that the distance $L_2$ represents a reference interval, or reference image interval for short, between the two images set for an in-focus condition.

FIG. 4 illustrates a circuit diagram of a deviation detecting device, and an automatic focusing system utilizing the same, wherein a CCD image sensor is used as the line sensor of FIG. 3.

Reference numeral 20 represents a photoelectric convertor circuit including the line sensor and the monitoring light sensing element both described above. This photoelectric convertor circuit 20 is fed with such inputs as a shift pulse SH, transfer clocks $\phi 1$ and $\phi 2$, and a clear pulse ICGS and provides such outputs as time-sequenced pixel signals OS, a monitor output AGCOS and a reference voltage output DOS. The clear pulse ICGS is a pulse used to initialize all of the pixels of the line sensor whereby accumulated charges are depleted from the respective pixels in readiness for the subsequent light-integration, that is, for the subsequent accumulation of charges. With the application of this pulse, integration of the output from the monitoring light sensing elements is initiated within the photoelectric convertor circuit 20, so that the monitor output AGCOS changes with the passage of time at a speed, depending on the brightness of the target object, relative to the reference voltage output DOS. The shift pulse SH shifts the accumulated charges from the respective pixels to a shift register inside the line sensor to thereby terminate the light integration at the respective pixels of the line sensor when applied to the photoelectric convertor circuit 20. The transfer clocks $\phi 1$ and $\phi 2$ are pulses shifted 180° in phase from each other so that the accumulated charges shifted to the shift register can be successively outputted from the shift register in time-sequenced fashion. The accumulated charges outputted thereby are converted into negative voltage signals within the photoelectric convertor circuit 20 and then outputted as the pixel signals OS.

Reference numeral 22 represents a subtractor circuit for subtracting the reference voltage output DOS from each pixel signal OS and for generating the pixel signals OS' which are positive voltage signals. Reference numeral 24 represents a peak hold circuit for sampling and holding the pixel signals OS' corresponding to some pixels shielded from light (for example, some pixels positioned leftwards of the leftmost pixel $l_1$ of the standard region L shown in FIG. 3) to generate a voltage VP corresponding to the maximum value of these pixel signals. Reference numeral 26 represents a gain variable amplifier for amplifying the pixel signal OS' subtracted by the output voltage $V_P$ of the peak hold circuit 24. By the subtraction performed in this amplifier, a dark current component contained in each pixel signal OS' can be removed. Reference numeral 28 represents and A/D convertor operable to convert the pixel signals OS" generated by the amplifier 26 into digital signals of predetermined bits, which are in turn fed to a microcomputer 30. Reference numeral 32 represents a gain control circuit operable to detect the amount of change of the monitor output AGCOS relative to the reference output DOS and to generate, when the amount of such change attains a predetermined threshold value within a predetermined length of time subsequent to the start of change of the monitor output (i.e., when the target object is bright), an output TINT indicative of the attainment, which is in turn fed to the microcomputer 30, and also a gain signal for setting the gain of the amplifier 26 to "X1". When the predetermined time elapses subsequent to the start of change of the monitor output AGCOS, a compulsory shift signal SHM is produced by the microcomputer 30 to the gain control circuit 32, causing the gain control circuit 32 to generate a gain signal for setting the gain of the amplifier 26 to "X1", "X2", "X4" or "X8" depending on the amount of change of the monitor output AGCOS relative to the reference voltage output DOS which has taken place till the time of the input of the signal SHM. In this case, the smaller the amount of change, the greater the gain to be set. Reference characters AN and OR represent an AND gate and an OR gate, respectively. The AND gate AN is adapted to receive the above mentioned signal TINT from the gain control circuit 32 and a signal SHEN from the microcomputer 30, whereas the OR gate OR is adapted to receive an output from the AND gate AN and the above mentioned signal SHM from the microcomputer 30. The signal SHEN from the microcomputer 30 is a signal for enabling the generation of a shift pulse SH from a shift pulse generator 34. This signal SHEN remains in a "Low" state during the period in which the generation of the shift pulse is to be inhibited (for example, during the data dumping from the photoelectric convertor circuit 20 to the microcomputer 30 and during the data calculation performed in the microcomputer 30), but assumes a "High" state subsequently to enable the AND gate AN. When the signal TINT is generated while this signal SHEN is in the "High" state, the AND gate AN generates a "High" signal TINT. The OR gate OR applies this signal TINT or the signal SHM to the shift pulse generator 34, which in turn generates the shift pulse SH. Reference numeral 36 represents a transfer clock generator operable to output the transfer clocks $\phi 1$ and $\phi 2$ in response to clock pulses CL applied thereto from the microcomputer 30. This generator 36 is reset to an initial condition when receiving the signal TINT or the signal SHM from the OR gate OR and starts newly generating transfer clocks $\phi 1$ and $\phi 2$ regardless of the phases of the previous clocks $\phi 1$ and $\phi 2$ for the purpose of establishing a synchronization between the shift pulse SH and the clocks $\phi 1$ and $\phi 2$. The microcomputer 30 generates a sample hold signal S/H for specifying the pixel signals DOS' to be placed in the peak hold circuit 24.

The microcomputer 30 is electrically connected with a display circuit 38 and also a lens drive unit 40 so as to cause the display circuit 38 to display the focus condition of the objective lens 2 determined by the above described calculation and, at the same time, cause the lens drive unit 40 to drive the objective lens for focusing thereof. The focus condition of the objective lens 2 determined by the calculation performed in the microcomputer is, in the illustrated embodiment, represented by the defocus amount and the defocus direction, and therefore, the amount and the direction of drive of the objective lens 2 to be performed by the lens drive unit 40 for focusing can be calculated therefrom. The lens drive unit 40 drives the objective lens 2 by such amount of drive in such direction of drive and also generates a signal indicative of the amount of drive of the objective lens 2, actually performed by the lens drive unit, to the microcomputer 30. The microcomputer 30 generates a signal necessary to halt the lens drive to the lens drive unit 40 when the actual amount of drive attains a value equal to the calculated amount of drive.

In FIG. 4, reference character AFSW represents a start switch for applying to the microcomputer a start signal necessary to start the deviation detection and an automatic focus adjustment based on the deviation detection.

Figure 5:
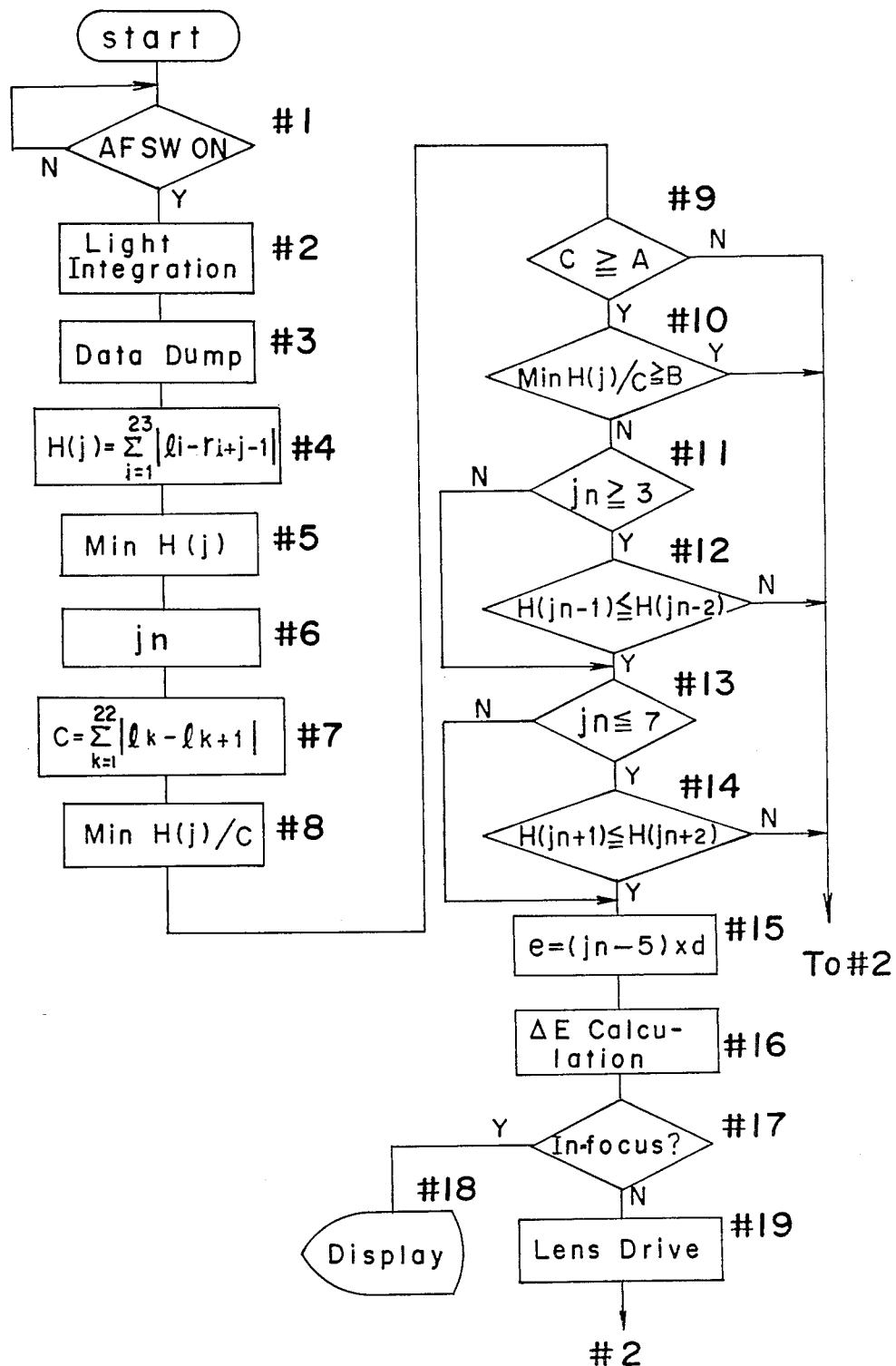
FIG. 5 is a flow chart showing the sequence of operation of a microcomputer used in the circuit of FIG. 4.

The operation of the microcomputer 30 will now be described with reference to FIG. 5. When an electric power supply switch (not shown) in a photographic camera is turned on, the program flow starts, and at step #1, a decision is made to determine if the start switch AFSW has been turned on. Where the start switch AFSW has been turned on, the microcomputer 30 generates, at step #2, the clear pulse ICGS which causes all of the pixels of the line sensor to initiate light integration after resetting all of the pixels of the line sensor to respective initial states. At this time, the monitor circuit within the photoelectric convertor circuit 20 starts integrating the output from the light sensing element for monitoring purpose and the monitor output AGCOS starts changing as hereinbefore described. Subsequently, when the gain control circuit 32 generates the signal TINT, the shift pulse generator 34 generates the shift pulse SH in response thereto. Also, when the predetermined time passes subsequent to the start of the light integration with no signal TINT generated because the target object is dark, the microcomputer 30 generates the signal SHM and the shift pulse generator 34 generates the shift pulse SH in response thereto. As a result, the light integration at step #2 terminates, and the pixel signals OS are outputted from the photoelectric convertor circuit 20 in time-sequenced fashion. At step #3 (Data Dumping), the microcomputer 30 receives the pixel signals OS" which have been digitalized in the A/D convertor 28. Subsequently, the microcomputer 30 performs the detection of the correlation degrees at step #4. This detection of the correlation degree is carried out by sequentially shifting a shift value j from 1 to 9 on the basis of the following equation:

$$H(j) = \sum_{i=1}^{23} l_i - r_{i+j-1} \quad (1)$$

wherein H(j) for each shift value j represents a correlation value. In this way, nine correlation values can be detected. The greater the correlation value H(j), the smaller the correlation degree. Conversely, the smaller the correlation value H(j), the greater the correlation degree. Step #5 is a step for determining the minimum correlation value MinH(j), that is, the maximum correlation degree, out of these nine correlation values, and step #6 is a step for determining the value $j_n$ of j, that is, the highest correlation shift position, which provides the minimum correlation value MinH(j). These steps #5 and #6 may be so modified as to hold a smaller correlation value H(j) and the value $j_n$ of j which results in the smaller correlation value, that is, the highest correlation shift position, upon each calculation of the correlation value according to the equation (1) can then be held. It is to be noted that $l_i$ and $r_i$ represent, for the purpose of brevity, the digitalized pixel signals OS″ fed from the A/D convertor and corresponding respectively to the i-th pixels of the standard region L and the reference region R.

At step #7, the microcomputer 30 calculates the contrast C of the image on the standard region L according to the following equation:

$$C = \sum_{k=1}^{22} |l_k - l_{k+1}| \quad (2)$$

Then, at step #8, MinH(j)/C which is the minimum correlation value MinH(j) normalized with the contrast C is calculated by the microcomputer 30. A decision is subsequently made at step #9 to determine if the contrast C is equal to or higher than a predetermined value A. If the contrast C is higher than the predetermined value A, the program flow proceeds to step #10 at which a decision is made to determine if the normalized minimum correlation value MinH(j)/C is equal to or greater than a predetermined value B. If the normalized correlation value MinH(j)/C is smaller than the predetermined value B, the program flow proceeds to step #11 at which a decision is made to determine if the number of $j_n$ which results in the minimum correlation value MinH(j) is equal to or greater than 3. If $j_n \geq 3$, another decision is made at step #12 to determine if the correlation value $H(j_{n-1})$ at the shift position $J_{n-1}$ preceding the $j_n$ by one in terms of the shift value j is equal to or greater than the correlation value $H(j_{n-2})$ at the shift position $j_{n-2}$ preceding the $j_n$ by two in terms of the shift value j. If the result of decision at step #12 indicates that the correlation value $H(j_{n-1})$ is equal to or smaller than the correlation value $H(j_{n-2})$, a further decision is made at step #13 to determine if $j_n$ is equal to or greater than 7. If the result of decision at step #13 indicates $j_n \geq 7$, a still further decision is made at step #14 to determine if the correlation value $H(j_{n+1})$ at the shift position $j_{n+1}$ which is ahead of $j_n$ by one in terms of j is equal to or smaller than the correlation value $H(j_{n+2})$ at the shift position $j_{n+2}$ which is ahead of $j_n$ by two in terms of j. If the result of decision at step #14 indicates $H(j_{n+1}) \geq H(j_{n+2})$, the program proceeds to #15 at which the amount of deviation is calculated as will be described later. When the result of decision at step #11 indicates $j_n < 3$, that is, where $j_n = 1$ or 2, meaning that neither $H(j_{n-1})$ nor $H(j_{n-2})$ exist, the program flow proceeds to step #13 without the decision at step #12 being carried out. Similarly, where the result of decision at step #13 indicates $j_n < 7$, that is, $j_n = 8$ or 9, meaning that neither $H(j_{n+1})$ nor $H(j_{n+2})$ exists, the program flow proceeds to step #15 without the decision at step #14 being carried out. Also, where the respective results of decision at steps #9, #10, #12 and #14 indicate $C < A$, MinH(j)$\geq B$, $H(j_{n-1}) > H(j_{n-2})$ and $H(j_{n+1}) > H(j_{n+2})$, respectively, the program flow returns to step #2 without the deviation calculation at step #15 being carried out, thereby to initiate the light integration again. In summary, in this program flow, three conditions which make the focus detection impossible or inaccurate are sequentially checked. More particularly, the first decision is as to whether the contrast C is lower than the predetermined value (step #9), the second decision is as to whether the maximum correlation degree is smaller than the predetermined value, i.e, when the minimum correlation value is greater than the predetermined value (step #10), and the third decision is as to whether the correlation degrees monotonously decrease in the opposite directions with respect to the shift position $j_n$ providing the maximum correlation degree (steps #11–#14). As to the third decision, if the result of decision at step #12 indicates $H(j_{n-1}) \leq H(j_{n-2})$, this means that there is the following relationship:

$$H(j_n) - H(j_{n-1}) \leq H(j_{n-2})$$

which shows the monotonous decrease of the correlation degree (the monotonous increase of the correlation values H(j)) at the shift positions preceding $j_n$, whereas if the result of decision at step #12 indicates $H(j_{n-1}) > H(j_{n-2})$, this means that the correlation degrees at the shift positions preceding $j_n$ fluctuate. Similarly, if the result of decision at step #14 indicates $H(j_{n+1}) \leq H(j_{n+2})$, this means that there is the following relationship:

$$H(j_n) < H(j_{n+1}) \leq H(j_{n+2})$$

which shows the monotonous decrease of the correlation degree (the monotonous increase of the correlation value H(j) at the shift position ahead of $j_n$, whereas if the result of decision at step #14 indicates $H(j_{n+1}) > H(j_{n+2})$, this means that the correlation degrees at the shift positions ahead of $j_n$ fluctuate.

Figure 7:
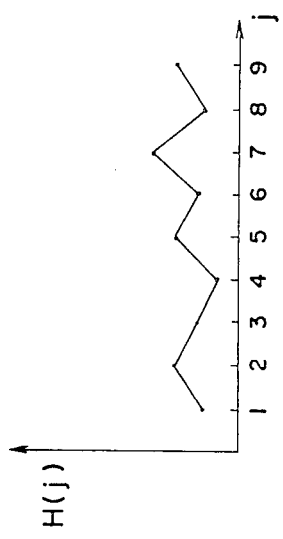
FIG. 7 is a graph showing a change in correlation values occurring when the correlation degrees in the vicinity of the highest correlation shift position fluctuate.
Figure 6:
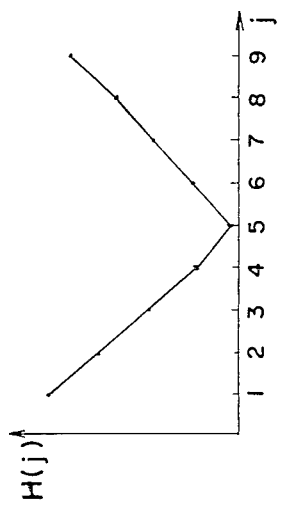
FIG. 6 is a graph showing a change in correlation values under normal conditions.

FIG. 6 illustrates the change in the correlation value H(j) which takes place when the results of decision at steps #12 and #14 have indicated $H(j_{n-1}) \leq H(j_{n-2})$ and $H(j_{n+1}) \leq H(j_{n+2})$ with $j_n = 5$, respectively. FIG. 7 illustrates the change in the correlation value H(j) which takes place when the result of decision at step #14 has indicated $H(j_{n+1}) < H(j_{n+2})$ with $j_n = 4$.

The calculation of the amount of deviation e of the images from a reference value which is the interval between the images in an in-focus condition is performed at step #15 by the use of the following equation:

$$e = (j_n - 5) \times d \quad (3)$$

wherein d represents the pitch of the pixels of the line sensor and 5 the reference value, respectively. After the calculation at the step #15, the microcomputer 30 starts calculating the defocus amount ΔE and the defocus direction at step #16 by the use of the following equation:

$$\Delta E = a \times e \quad (4)$$

wherein $a$ is a constant determined by the optical system. In practice, the correction factor (of a value smaller than 1 in the case of the rear focus condition and greater than 1 in the case of the front focus condition) which is chosen depending on the magnification of the image may be introduced to correct the defocus amount ΔE in the equation (4) where precise determination is desired. This is disclosed in copending U.S. patent application Ser. No. 570,012, filed Jan. 10, 1984, and assigned to the assignee of the present invention, and accordingly, the details thereof will not be reiterated here for the sake of brevity. It is, however, to be noted that if the defocus amount is smaller than 0, it means the front focus condition, but if it is greater than 0, it means the rear focus condition.

Once the defocus amount ΔE has been determined the microcomputer 30 performs a decision at step #17 to determine if the defocus amount ΔE falls within a predetermined in-focus range representative of a substantial in-focus condition. If it falls within the predetermined in-focus range, the display of the in-focus condition is performed at step #18 by means of the display unit 38. However, if the defocus amount ΔE is out of the predetermined in-focus range, the lens drive unit 40 is energized at step #19 to drive the objective lens 2 according to the magnitude of the defocus amount ΔE and the defocus direction, and then the program flow returns to step #2 for initiating the light integration again.

It is to be noted that the program flow described with reference to FIG. 5 may be modified in several ways. By way of example, a step for causing the display unit 38 to give a warning may be provided midway in the return flow between any one of the steps #9, #10, #12 and #14 and the step #2.

Figure 8:
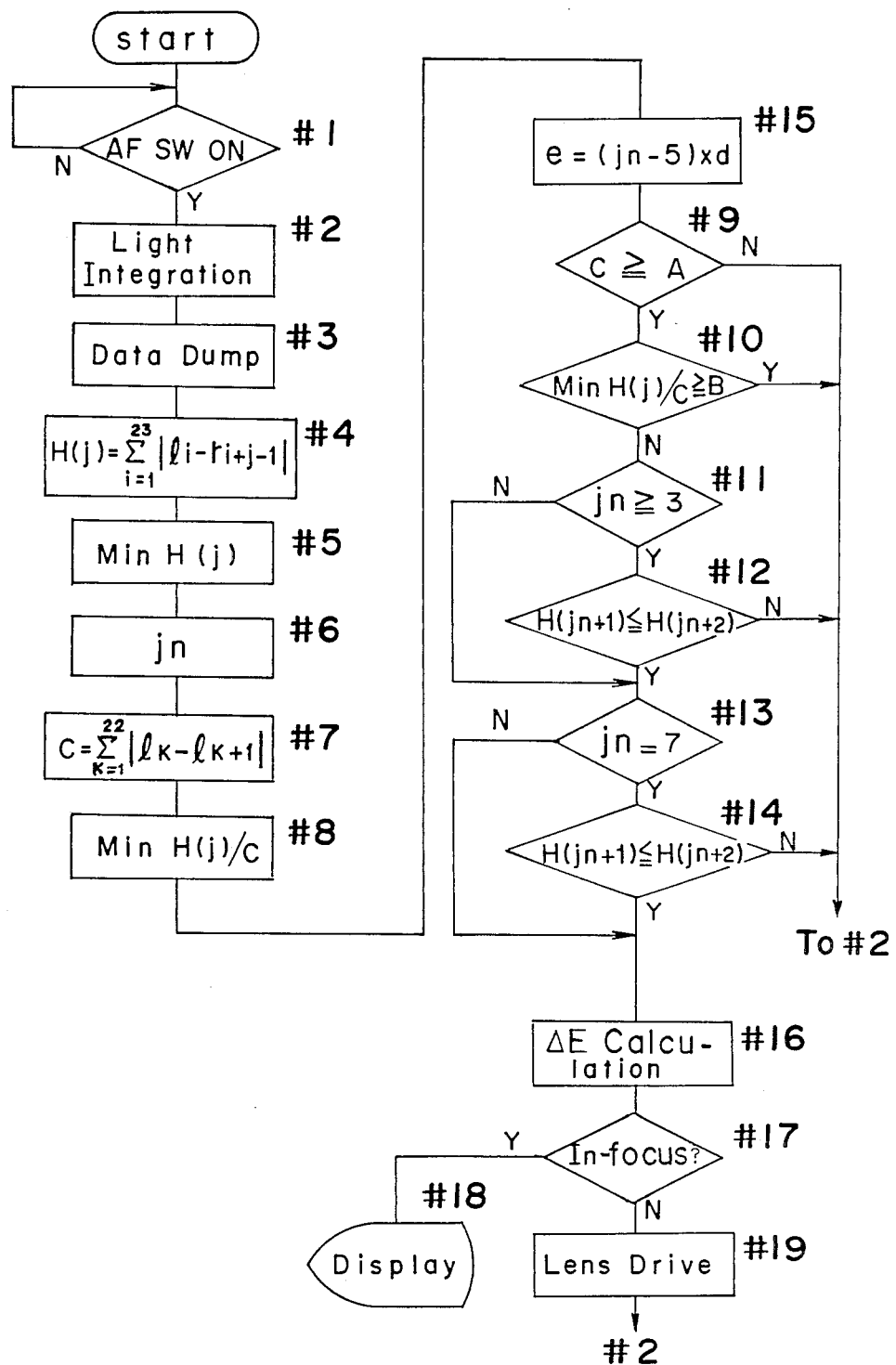
FIGS. 8 and 9 are flow charts showing the sequence of operation of the microcomputer according to the different embodiments of the present invention.

Also, as shown in FIG. 8, the sequential steps #9 to #14 may be performed subsequent to step #15 and preceding the step #16. In this case, the calculation of the amount of deviation e is performed at all times, but no calculation of the defocus amount ΔE is performed when the program flow proceeds from any one of the steps #9, #10, #12 and #14 to the step #2.

Figure 9:
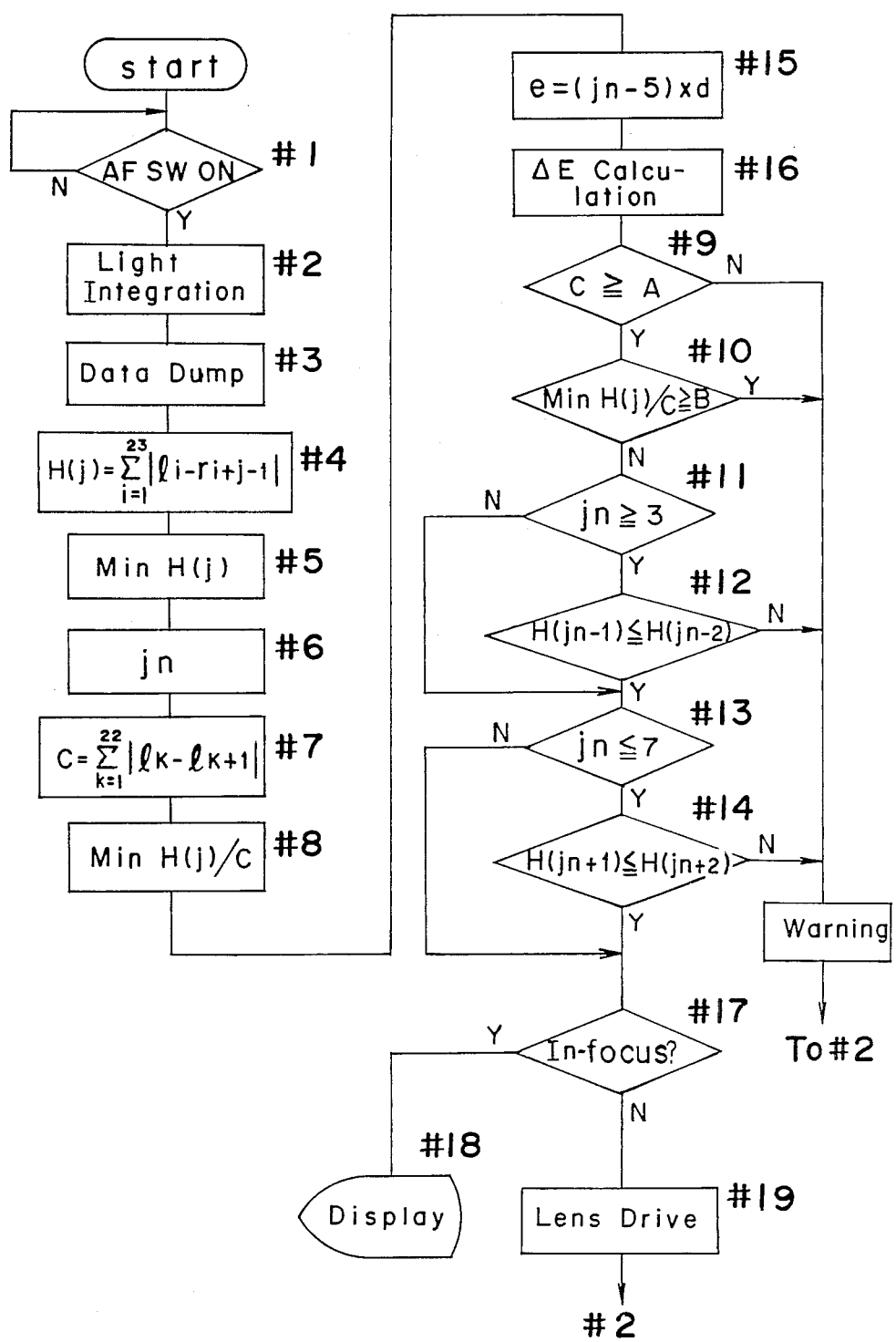

Moreover, the sequential steps #9 to #14 may be provided between the steps #16 and #17, as shown in FIG. 9, or between the steps #17 and #18, so that, although the calculation of even the defocus amount ΔE is performed at all times, a warning display is effected by the display unit 38 instead of the display of the in-focus condition, or the lens drive is carried out by the lens drive unit 40, during the return of the program flow from any one of the steps #9, #10, #12 and #14 to the step #2.

In any event, the decision steps #9 and #10 are not always essential to the practice of the present invention and may be utilized as desired.

Although the present invention has been described as applied to focus detection for detecting the focus condition of an objective lens relative to target object, the present invention can be equally applicable to distance measurement for measuring the distance to a target object. An example of such distance measurement is of the trigonometric survey type wherein a line sensor similar to that shown in FIG. 3 is utilized for detecting respective light intensity distributions of first and second images of a target object formed by first and second objective lenses spaced a predetermined base line length from each other and the amount of deviation of these first and second images are determined by a process similar to that described in connection with the above preferred embodiment thereby to detect the distance to the target object.

Although in the foregoing description of the embodiments, each of the pixel signals OS' has been described as converted by the A/D convertor 28 into the digital signals of predetermined bits, it may be converted into binary signals such as disclosed in the previously mentioned U.S. Pat. No. 4,305,657. In this case, the degree of correlation between the binary coded pixel signals from the standard region L and those from the reference region R at each shift position can be expressed in terms of the number of coincidences between those corresponding pixel signals. The greater the number of coincidence, the greater the correlation degree. Accordingly, the greatest number of coincidences stands for the maximum correlation degree, and whether or not the number of coincidences monotonously decrease with respect to the highest correlation shift position providing the maximum correlation degree is determined by determining which one of the number of coincidences at the shift position next to the highest correlation shift position and the number of coincidences at the shift position further next to the highest correlation shift position is greater or smaller than the other. In other words, if the number of coincidences at the shift position next to the highest correlation shift position is smaller than that at the shift position further next to the highest correlation shift position, the number of coincidences and thus the correlation degrees monotonously decrease with respect to the highest correlation shift position, but if the relationship therebetween is reverse, the number of coincidences and thus the correlation degrees so fluctuate that the detection of the deviation amount should be inhibited.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A deviation detecting device comprising:
   optical means for forming first and second images of an object which are correlated to each other;
   first and second image sensing means for sensing said first and second images so as to generate first and second outputs representative of the intensity distributions of said first and second images, respectively;
   correlation detection means for shifting said first output relative to said second output while incrementally changing the amount of shifting so as to detect a plurality of correlation degrees representative of the degrees of the correlation between said first and second outputs at different shift positions defined by the incremental change in the amount of shifting;
   highest correlation shift position detection means for detecting the shift position which is defined by the amount of shifting providing the highest correlation degree among said plurality of correlation degrees;

calculation means for calculating, based on said shift position detected by highest correlation shift position detection means, data corresponding to the amount of deviation of said first and second images from a reference value; and first determination means for determining which of the correlation degree at the next shift position next to said shift position detected by said highest correlation shift position detection means and the correlation degree at the further next position next to said next shift position is lower than the other, and wherein said deviation amount calculation means is arranged to be disabled when the determination by said first determination means indicates that the correlation degree at said next shift position is lower than that at said further next shift position.

2. A deviation detecting device as defined in claim 1, further comprising:

contrast detection means for detecting the contrast of at least one of said first and second images; and second determination means for determining whether the contrast detected by said contrast detection means is higher or lower than a predetermined threshold level; and wherein said deviation amount calculation means is arranged so as to be disabled when the determination by said second determination means indicates that the contrast detected by said contrast detection means is lower than the threshold level and said first and second determination means are arranged such that the determination by said second determination means is effected in advance of the determination by said first determination means.

3. A deviation detecting device as defined in claim 1, further comprising:

contrast detection means for detecting the contrast of at least one of said first and second images;

normalization means for normalizing the highest correlation degree amount said plurality of correlation degrees by the contrast detected by said contrast detection means; and second determination means for determining whether the normalized highest correlation degree is higher or lower than a predetermined threshold level, and wherein said deviation amount calculation means is arranged to be disabled when the determination by said second determination indicates that the normalized highest correlation degree is lower than the threshold level and said first and second determination means are arranged such that the determination by said second determination means is effected in advance of the determination by said first determination means.

4. A deviation detecting device as defined in claim 1, 2 or 3, further comprising means for giving a warning display when said deviation amount calculation means is disabled.

5. A deviation detecting device as defined in claim 1, further comprising an objective lens adjustable for focusing, said optical means having an arrangement for causing the distance between said first and second images to vary with the focus condition of said objective lens relative to said object.

6. A deviation detecting device as defined in claim 1, wherein said optical means has an arrangement for causing the distance between said first and second images to vary with the distance from said device to said object.

7. An automatic focusing system comprising:

an objective lens;

optical means for forming first and second images of an object which are correlated to each other, such that the distance between said first and second images varies with the focus condition of said objective lens relative to said object;

first and second image sensing means for sensing said first and second images so as to generate first and second outputs representative of the intensity distributions of said first and second images, respectively;

correlation detection means for shifting said first output relative to said second output while incrementally changing the amount of shifting so as to detect a plurality of correlation degrees representative of the degrees of the correlation between said first and second outputs at different shift positions defined by the incremental change in the amount of shifting;

highest correlation shift position detection means for detecting the shift position which is defined by the amount of shifting providing the highest correlation degree among said plurality of correlation degrees;

calculation means for calculating, based on said shift position detected by said highest correlation shift position detection means, data corresponding to the amount of deviation of said first and second images from a reference value; and drive means for driving said objective lens for focusing in accordance with said data calculated by said calculation means; and first determination means for determining which of the correlation degree at the next shift position next to said shift position detected by said highest correlation shift position detection means and the correlation degree at the further next position next to said next shift position is lower than the other, and wherein at least one of said calculation means and said drive means is arranged so as to be disabled when the determination by said first determination means indicates that the correlation degree at said next shift position is lower than said further next position.

8. An automatic focusing system as defined in claim 7, further comprising:

contrast detection means for detecting the contrast of at least either one of said first and second images; and second determination means for determining whether the contrast detected by said contrast detection means is higher or lower than a predetermined threshold level, and wherein at least one of said calculation means and said drive means is arranged so as to be disabled when the determination by said second determination indicates that the contrast detected by said contrast detection means is lower than the threshold level and said first and second determination means are arranged such that the determination by said second determination means is effected in advance of the determination by said first determination means.

9. An automatic focusing system as defined in claim 7, further comprising:

contrast detection means for detecting the contrast of at least either one of said first and second images; and normalization means for normalizing the highest correlation degree among said plurality of correlation degrees by the contrast detected by said contrast detection means; and second determination means for determining whether the normalized highest correlation degree is higher or lower than a predetermined threshold level, and wherein at least one of said calculation means and said drive means is arranged so as to be disabled when the determination by said second determination means indicates that the normalized highest correlation degree is lower than the threshold level and said first and second determination means are arranged such that the determination by said second determination means is effected in advance of the determination by said first determination means.

10. An automatic focusing system as defined in claim 7, 8 or 9 further comprising means for giving a warning display when at least one of said calculation means and said drive means is disabled.

11. An image sensing system comprising:

optical means, for forming first and second images of an object which are correlated to each other;

first and second image sensing means for sensing said first and second images so as to generate first and second outputs representative of the intensity distributions of said first and second images, respectively;

correlation detection means for shifting said first output relative to said second output while incrementally changing the amount of shifting so as to detect a plurality of correlation degrees representative of the degrees of the correlation between said first and second outputs at different shift positions defined by the incremental change in the amount of shifting;

highest correlation shift position detection means for detecting the shift position which is defined by the amount of shifting providing the highest correlation degree among said plurality of correlation degrees;

calculation means for calculating, based on said shift position detected by highest correlation shift position detection means, data corresponding to the amount of deviation of said first and second images from a reference value; and circuit means responsive to said data calculated by said calculation means; and first determination means for determining which of the correlation degree at the next shift position next to said shift position detected by said highest correlation shift position detection means and the correlation degree at the further next position next to said next shift position is lower than the other, and wherein said circuit means is arranged so as not to respond to said data calculated by said calculation means when the determination by said first determination means indicates that the correlation means indicates that the correlation degree at said next shift position is lower than the determination at said further next shift position.

12. An image sensing system as defined in claim 11, further comprising:

contrast detection means for detecting the contrast of at least one of said first and second images; and second determination means for determining whether the contrast detected by said contrast detection means is higher or lower than a predetermined threshold level, and wherein said circuit means is arranged so as not to respond to said data calculated by said calculation means when the determination by said second determination means indicates that the contrast detected by said contrast detection means is lower than the threshold level and said first and second determination are arranged such that the determination by said second determination means is effected in advance of the determination by said first determination means.

13. An image sensing system as defined in claim 11, further comprising:

contrast detection means for detecting the contrast of at least one of said first and second images;

normalization means for normalizing the highest correlation degree among said plurality of correlation degrees by the contrast detected by said contrast detection means; and second determination means for determining whether the normalized highest correlation degree is higher or lower than a predetermined threshold level, and wherein said circuit means is also arranged so as not to respond to said data calculated by said calculation means when the determination by said second determination means indicates that the normalized highest correlation degree is lower than the threshold level and said first and second determination means are arranged such that the determination by said second determination means is effected in advance of the determination by said first determination means.

14. An image sensing system as defined in claim 11, further comprising means for giving a warning display when the determination by said first determination means indicates that the correlation degree at said next shift position is lower than that at said further next shift position.

15. An automatic focusing system comprising:

an objective lens;

optical means for forming first and second images of an object which can be correlated to each other, such that the distance between the first and second images varies with the focus condition of the objective lens relative to the object;

first and second image sensing means for sensing the first and second images so as to generate first and second outputs representative of the intensity distributions of the first and second images, respectively;

correlation detection means for shifting the first output relative to the second output while incrementally changing the amount of shifting so as to detect a plurality of correlation degrees representative of the degrees of the correlation between the first and second outputs at different shift positions defined by the incremental change in the amount of shifting;

first means for determining the contrast of one of the images and comparing it to a predetermined value;

second means for determining the maximum correlation degree and comparing it to a predetermined value;

third means for determining if the correlation degrees monotonously vary in opposite directions relative to the shift position providing the maximum correlation degree, and control means responsive to the first through third determining means, to determine if the sensed intensity distributions of the images are valid for focus detection.

16. A deviation detecting device comprising:

first and second image sensing means for sensing first and second images formed thereon so as to generate first and second outputs representative of the intensity distributions of said first and second images, respectively;

correlation detection means for shifting said first output relative to said second output while incrementally changing the amount of shifting so as to detect a plurality of correlation degrees representative of the degrees of the correlation between said first and second outputs at different shift positions defined by the incremental change in the amount of shifting;

a highest correlation shift position detection means for detecting the shift position which is defined by the amount of shifting providing the highest correlation degree among said plurality of correlation degrees;

determination means for determining which of the correlation degrees at the next shift position next to said shift position detected by said highest correlation shift position detection means and the correlation degree at the further next position next to said next shift position is lower than the other, and instruction signal producing means for producing an instruction signal when the determination by said determination means indicates that the correlation degree at said next shift position is lower than that at said further next shift position.

* * * * *